United States Patent
Zhao et al.

(10) Patent No.: US 12,439,322 B2
(45) Date of Patent: Oct. 7, 2025

(54) METHOD AND APPARATUS FOR MANAGING AN INTERNET OF THINGS DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 615 days.

(21) Appl. No.: 17/793,152

(22) PCT Filed: Jan. 19, 2021

(86) PCT No.: PCT/CN2021/072646
§ 371 (c)(1),
(2) Date: Jul. 15, 2022

(87) PCT Pub. No.: WO2021/147844
PCT Pub. Date: Jul. 29, 2021

(65) Prior Publication Data
US 2023/0099493 A1    Mar. 30, 2023

(30) Foreign Application Priority Data

Jan. 22, 2020 (CN) .......................... 202010074106.1

(51) Int. Cl.
*H04W 40/32* (2009.01)
*H04L 67/12* (2022.01)
(Continued)

(52) U.S. Cl.
CPC ............. *H04W 40/32* (2013.01); *H04L 67/12* (2013.01); *H04W 40/12* (2013.01); *H04W 40/20* (2013.01); *G16Y 40/40* (2020.01)

(58) Field of Classification Search
CPC ........ G16Y 40/40; G16Y 10/75; H04L 67/12; H04L 67/52; H04L 45/46; H04L 67/025;
(Continued)

(56) References Cited

U.S. PATENT DOCUMENTS

| 9,883,472 B1 | 1/2018 | Tamhane et al. |
| 10,034,261 B2 | 7/2018 | Kim et al. |

(Continued)

FOREIGN PATENT DOCUMENTS

| CN | 102842197 A | 12/2012 |
| CN | 104714412 A | 6/2015 |

(Continued)

OTHER PUBLICATIONS

Chinese Office Action corresponding to Chinese Patent Application No. 202010074106.1 (Foreign Text, 8 Pages, English Translation Thereof, 5 Pages) (Jun. 5, 2024).

(Continued)

*Primary Examiner* — Khoa Huynh
(74) *Attorney, Agent, or Firm* — Myers Bigel, P.A.

(57) ABSTRACT

A method and an apparatus for managing an IoT device, and a computer readable storage medium are disclosed. The method for managing an IoT device includes creating a group resource, the group resource including a first member and a first preset condition, determining, from a plurality of IoT devices, at least one IoT device whose relationship with the first member satisfies the first preset condition as a second member of the group resource, wherein the first preset condition comprises at least one of the following: a distance between the second member and the first member
(Continued)

being less than a first distance threshold, and a difference between a communication signal intensity of the second member and a communication signal intensity of the first member being less than a first intensity difference threshold.

19 Claims, 7 Drawing Sheets

(51) Int. Cl.
*H04W 40/12* (2009.01)
*H04W 40/20* (2009.01)
*G16Y 40/40* (2020.01)

(58) Field of Classification Search
CPC ...... H04L 67/125; H04L 45/36; H04W 40/32; H04W 40/12; H04W 40/20
See application file for complete search history.

(56) References Cited

U.S. PATENT DOCUMENTS

| | | | |
|---|---|---|---|
| 2016/0373971 A1 | 12/2016 | Kulal | |
| 2017/0156038 A1* | 6/2017 | Chen | ................ H04W 4/70 |
| 2017/0200003 A1* | 7/2017 | Zaver | ................ H04L 9/0656 |
| 2020/0145175 A1 | 5/2020 | Hassan Hussein et al. | |
| 2020/0382596 A1 | 12/2020 | Zhao | |
| 2021/0288755 A1* | 9/2021 | Abedi | ................ H04L 1/1678 |

FOREIGN PATENT DOCUMENTS

| | | |
|---|---|---|
| CN | 105515834 A | 4/2016 |
| CN | 105718502 A | 6/2016 |
| CN | 107484214 A | 12/2017 |
| CN | 108462949 A | 8/2018 |
| CN | 108683715 A | 10/2018 |
| CN | 109218035 A | 1/2019 |
| CN | 110177362 A | 8/2019 |
| EP | 3404985 A1 | 11/2018 |

OTHER PUBLICATIONS

Extended European Search Report for European Application No. 21745068.3 (11 pages) (dated Dec. 14, 2023).
International Serach Report and Written Opinion for PCT/CN2021/072646 mailed Apr. 8, 2021, with translation, 13 pages.

* cited by examiner

METHOD AND APPARATUS FOR MANAGING AN INTERNET OF THINGS DEVICE

RELATED APPLICATIONS

The present application is the U.S. national phase entry of PCT/CN2021/072646, with an international filing date of Jan. 19, 2021, which claims the benefit of Chinese Patent application Ser. No. 202010074106.1 filed on Jan. 22, 2020, the entire disclosures of both of which are incorporated herein by reference.

FIELD

The present disclosure relates to the field of data processing technologies, particularly to a method and an apparatus for managing an Internet of Things (IoT) device, and a computer readable storage medium.

BACKGROUND

With the improvement in the digitization level, information in the physical world is digitized using the Internet of Things (IoT) technology, which improves the levels of management, operation and maintenance. In a conventional IoT structure, information of persons, affairs and things is collected and sent to a gateway by means of an IoT device which may be various sensors or intelligent terminal devices. The gateway sends the collected data to a cloud platform for data storage, processing and analysis, receives remote management and control instructions, and issues them to devices/sensors to which persons, affairs, things, etc. correspond.

SUMMARY

An embodiment of the present disclosure provides a method for managing an IoT device, comprising: creating a group resource, the group resource comprising a first member and a first preset condition; determining, from a plurality of IoT devices, at least one IoT device whose relationship with the first member satisfies the first preset condition as a second member of the group resource; wherein the first preset condition comprises at least one of the following: a distance between the second member and the first member being less than a first distance threshold, and a difference between a communication signal intensity of the second member and a communication signal intensity of the first member being less than a first intensity difference threshold.

In some embodiments, said creating a group resource comprises: acquiring the first preset condition and a fifth preset condition for the group resource; determining, from a plurality of IoT devices, at least one IoT device that meets the fifth preset condition as the first member; and including the first member, the first preset condition and the fifth preset condition in the group resource; wherein the fifth preset condition comprises at least one of the following: positional coordinates of the first member being in a first coordinate range; and a variation range of positional information of the first member within a first preset time interval being smaller than a first preset positional variation range threshold.

In some embodiments, said creating a group resource comprises: acquiring the first preset condition for the group resource, and determining the at least one IoT device that sends the request for creating a group resource as the first member of the group resource in response to receiving, from at least one IoT device of the plurality of IoT devices, a request for creating a group resource; and including the first preset condition and the first member in the group resource.

In some embodiments, the group resource further comprises a second preset condition, and the method further comprises: after determining the second member, determining whether a relationship between the first member and the second member meets the second preset condition, and if so, adjusting a second configuration information of the second member according to a first configuration information of the first member; wherein the second preset condition comprises at least one of the following: a device type of the first member being the same as a device type of the second member; and a type of data collected by the first member being the same as a type of data collected by the second member.

In some embodiments, the group resource further comprises a fourth preset condition, and the method further comprises: after determining the second member, determining whether a relationship between the first member and the second member meets the fourth preset condition, and if so, adjusting the second configuration information of the second member according to the first configuration information of the first member; wherein the fourth preset condition comprises at least one of the following conditions: a data collection accuracy of the first member being greater than a data collection accuracy of the second member; a data collection frequency of the first member being greater than a data collection frequency of the second member; a number of references to data of the first member being larger than a number of references to data of the second member; and a communication signal intensity of the first member being greater than a communication signal intensity of the second member.

In some embodiments, the group resource comprises a third preset condition, and the method further comprises: after determining the second member, determining whether the second member meets the third preset condition, and if so, deleting the second member from the group resource, wherein the third preset condition comprises at least one of the following: a distance between the second member and the first member being greater than a second distance threshold; and a difference between a communication signal intensity of the second member and a communication signal intensity of the first member being greater than a second intensity difference threshold.

In some embodiments, the group resource further comprises a seventh preset condition, and the method further comprises: after determining the second member: acquiring data collected by the first member and data collected by the second member; and determining whether a relationship between the data collected by the first member and the data collected by the second member meets the seventh preset condition, and if so, adjusting the second configuration information of the second member according to the first configuration information of the first member, wherein the seventh preset condition comprises a difference between the data collected by the second member and the data collected by the first member being greater than a data difference threshold.

In some embodiments, said determining, from a plurality of IoT devices, at least one IoT device whose relationship with the first member meets the first preset condition comprises: in response to receiving a group joining request from at least one IoT device of the plurality of IoT devices, determining whether a relationship between the first member and the at least one IoT device of the plurality of IoT devices that sends the group joining request meets the first preset condition.

In some embodiments, the group resource further comprises a sixth preset condition, and said determining, from a plurality of IoT devices, at least one IoT device whose relationship with the first member meets the first preset condition comprises: in response to said receiving a group joining request from at least one IoT device of the plurality of IoT devices, determining whether the at least one IoT device that sends the group joining request meets the sixth preset condition, and if so, determining, from the at least one IoT device that meets the sixth preset condition, an IoT device whose relationship with the first member meets the first preset condition, wherein the sixth preset condition comprises at least one of the following: positional coordinates of the second member being in a second coordinate range; and a variation range of positional information of the second member within a first preset time interval being larger than a second preset positional variation range threshold.

In some embodiments, the IoT device is an environmental monitoring device, and the data collected by the first member and the second member are all environmental monitoring data.

In some embodiments, the first member has a control authority over the second member, and the second member does not have a control authority over the first member.

In some embodiments, the fifth preset condition further comprises at least one of the following: a data collection accuracy of the first member being greater than a first data collection accuracy threshold; a data collection frequency of the first member being greater than a first data collection frequency threshold; a number of references to data of the first member being larger than a first threshold of a number of references to data; and a communication signal intensity of the first member being greater than a first preset communication signal intensity.

In some embodiments, the sixth preset condition further comprises at least one of the following: a data collection accuracy of the second member being less than a second data collection accuracy threshold; a data collection frequency of the second member being less than a second data collection frequency threshold; a number of references to data of the second member being smaller than a second threshold of a number of references to data; and a communication signal intensity of the second member being less than a second preset communication signal intensity.

An embodiment of the present disclosure further provides an apparatus for managing an Internet of Things (IoT) device, comprising: a processor; a memory, the memory being communicatively connected to the processor; wherein at least one instruction is stored on the memory, and the at least one instruction is used to carry out any method described above when executed by the processor.

An embodiment of the present disclosure further provides a computer readable storage medium storing a computer program, wherein the computer program carries out steps of any method described above when executed by the processor.

BRIEF DESCRIPTION OF THE DRAWINGS

In order to illustrate the technical solutions of embodiments of the present disclosure more clearly, the drawings of the embodiments will be briefly introduced below. Obviously, the drawings in the description below relate to some embodiments of the present disclosure, rather than limit the present disclosure.

DETAILED DESCRIPTION

In order to make the objectives, technical solutions and advantages of embodiments of the present disclosure clearer, the technical solutions of the embodiments of the present disclosure will be described clearly and completely below in conjunction with the accompanying drawings of the embodiments of the present disclosure. Obviously, the described embodiments are part of the embodiments of the present disclosure, rather than all of them. All other embodiments obtained by a person having an ordinary skill in the art based on the described embodiments of the present disclosure without undue experimentation fall within the protection scope of the present disclosure.

Unless otherwise defined, the technical terms or scientific terms used in the present disclosure shall have usual meanings understood by a person having an ordinary skill in the field to which the present disclosure pertains. "First", "second" and other similar words used in the present disclosure do not denote any order, quantity or importance, but are used to distinguish different components. Likewise, "a", "an" or "the" and other similar words do not mean a quantity limit, but rather mean that there is at least one. "Comprise" or "include" and other similar words mean that an element or an item preceding the words encompasses elements or items and their equivalents listed after the words, but do not exclude other elements or items. "Connected" or "linked" and other similar words are not limited to physical or mechanical connections, but may include electrical connections, regardless of being direct or indirect. "Upper", "lower", "left", "right", etc. are used to indicate relative positional relationships. When the absolute position of a described object changes, the relative positional relationship may also change accordingly.

Figure 1A:
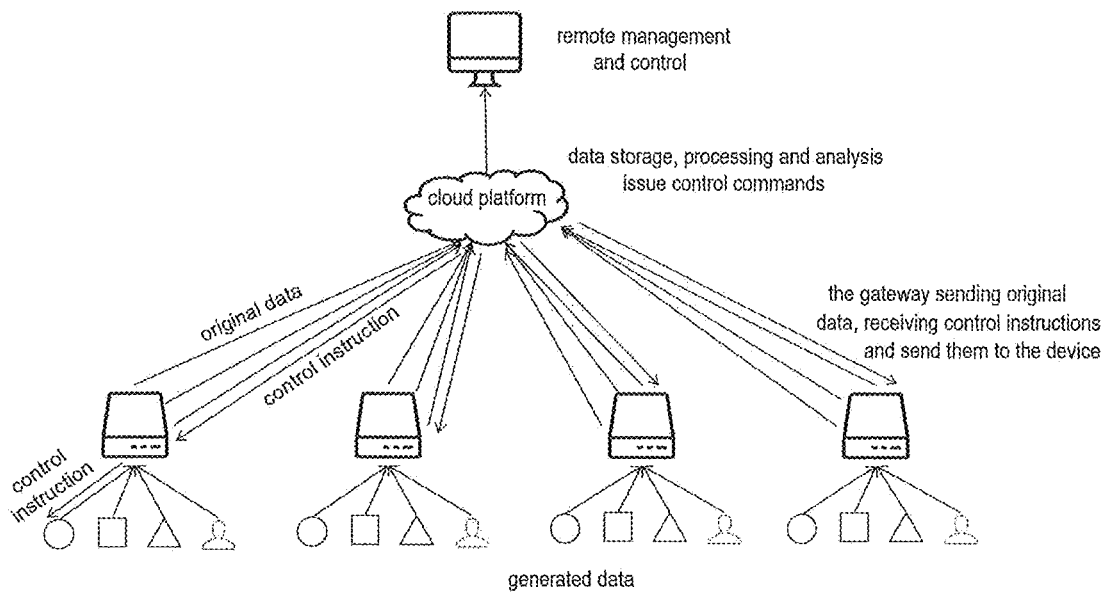
FIG. 1A is a schematic view of an Internet of Things (IoT) system structure.

FIG. 1A illustrates an IoT system structure. In the IoT system structure, information of persons, affairs and things is collected and sent to a gateway by an IoT device (such as a stationary device, a mobile device and the like). The gateway sends the collected data to a cloud platform for data storage, processing and analysis. Meanwhile, the gateway receives remote management and control instructions, and then issues them to IoT devices to which persons, affairs, things, etc. correspond.

Figure 1B:
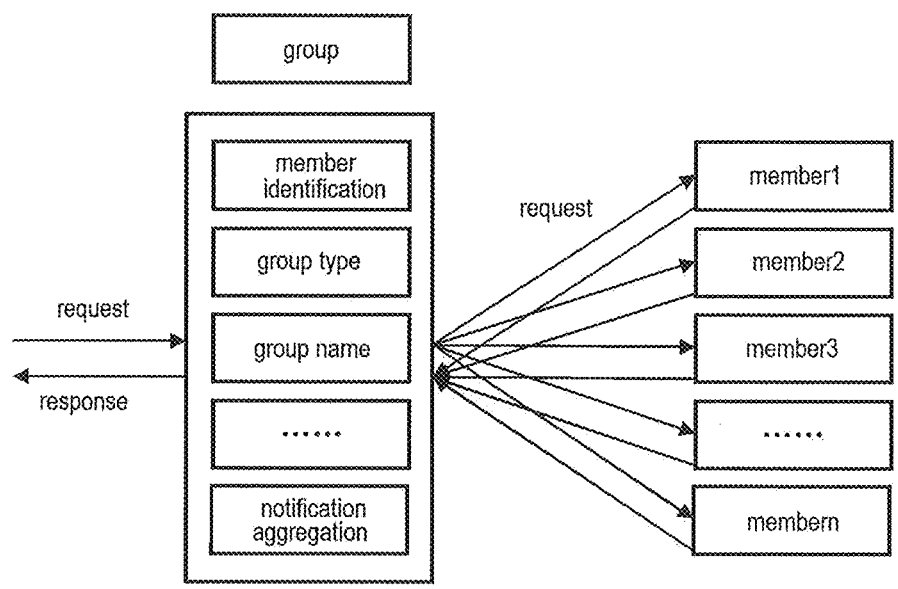
FIG. 1B is a schematic view illustrating an interaction relationship between a group and a member.

In order to manage a large number of devices, a group (also referred to as a group resource hereinafter) may be created. That is, certain IoT devices with specific properties are classified into a group, so as to realize batch management of devices. Members in a group are usually devices of the same type. After receiving a request, the group forwards the request to each member in the group, and aggregates responses of the members in the group and sends them to the requesting party, as shown in FIG. 1B.

The creation of a group can be achieved by an application (or APP) which initiates to the cloud platform a request for creating a group and a request for updating a group after determining members of the group. For example, a device group may be created according to the device type, location, manufacturer, etc. The members in the device group have the same identity and together accept management of the cloud platform and the application.

Figure 1C:
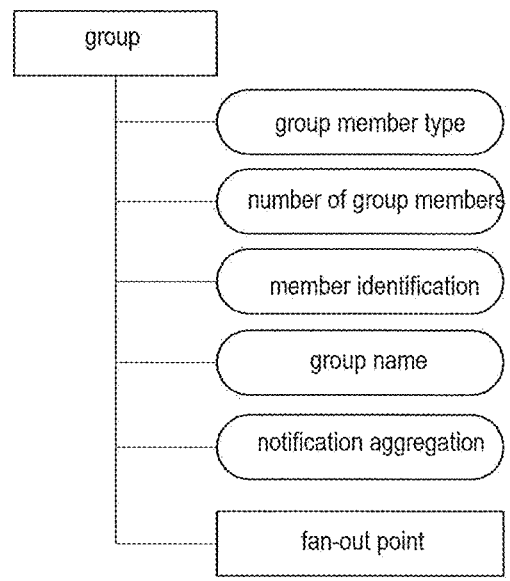
FIG. 1C is a schematic view of a group structure.

A group structure is shown in FIG. 1C. The group structure describes types of group members, the number of group members, member identifications (which may be a list), the group name, and notification aggregation (a switch used to set whether to turn on the member response aggregation function). When the fan-out point of the group receives a request, the group sends the request to each group member denoted by the member identification. In this group structure, the group members have the same responsibility.

Figure 2:
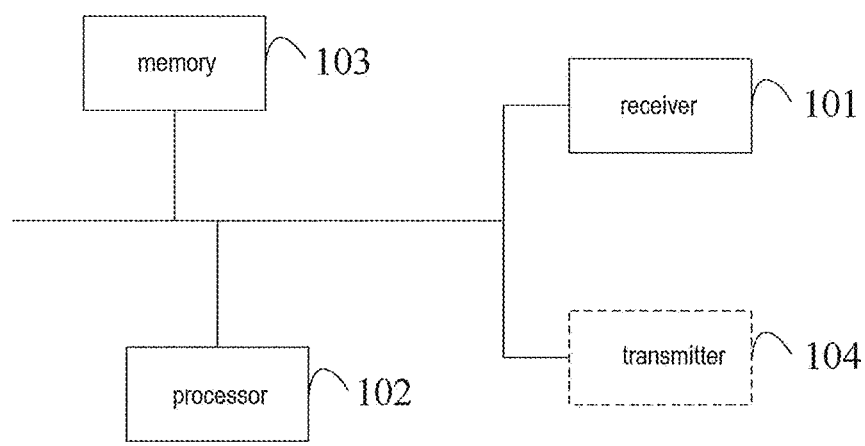
FIG. 2 is a schematic structural view of a management apparatus of an IoT device provided by an embodiment of the present disclosure.

FIG. 2 illustrates a schematic structural view of a management apparatus of an IoT device provided by an embodiment of the present disclosure.

As shown in FIG. 2, the management apparatus of an IoT device comprises: a receiver 101 configured to perform a corresponding data receiving operation; a processor 102 configured to perform the following steps: creating a group resource including a first member and a first preset condition; and determine, from a plurality of IoT devices, at least one IoT device whose relationship with the first member meets the first preset condition as a second member of the group resource, wherein the first member and the second member are both monitoring devices, and the first preset condition includes at least one of the following conditions: a distance between the second member and the first member being less than a first distance threshold; and a difference between a communication signal intensity of the second member and a communication signal intensity of the first member being less than a first intensity difference threshold.

For example, the management apparatus may further comprise a memory 103, which is communicatively connected to the processor 102. The memory 103 stores instructions that can be executed by the processor 102, and the instructions are executed by the processor 102, so that the processor 102 can perform corresponding data processing operations.

The memory 103, as a non-volatile computer readable storage medium, can be used to store non-volatile software programs, non-volatile computer executable programs and modules, such as program instructions/modules to which a method for managing an IoT device in an embodiment of the present application corresponds. The processor 102 executes various functional applications and data processing of the server by running non-volatile software programs, instructions and modules stored in the memory 103, thereby realizing the abovementioned method.

The memory 103 may include a program storage region and a data storage region, where the program storage region can store an operating system and an application program required by at least one function; the data storage area can store data created according to use of the management apparatus of an IoT device, etc. In addition, the memory 103 may include a high-speed random access memory, and may also include a non-volatile memory, for example, at least one magnetic disk storage device, a flash memory device, or other non-volatile solid-state storage devices. In some embodiments, the memory 103 may include, for example, a memory remotely disposed with respect to the processor 102, and these remote memories may be connected to a member's user behavior monitoring devices through networks. Examples of the aforementioned networks include, but are not limited to, the Internet, corporate intranets, local area networks, mobile communication networks, and combinations thereof.

In this embodiment, the group may refer to a group whose members are in a dynamically adjusting state, that is, the members therein are not static, but can be added or deleted according to actual needs and changes. For example, the number of the first member may be one or multiple.

For example, the request for creating a group may be from the first member, or may be generated spontaneously by the management apparatus of an IoT device. In a scenario where there are multiple first members, a group may be created for each first member, or the first members may be classified into multiple categories according to the characteristics of the first members, and then the first members of the same category are created in one group. The creation method can be set as needed, which will not be described here for simplicity.

In this embodiment, the first members refer to one type of members in a group to be created, and the first member may correspond to any IoT device used to obtain information of persons, affairs and things. The screening condition for the first member is set as needed, which is related to the attributes or characteristics of the group that needs to be created, or is related to the purpose to be achieved by the group that needs to be created.

For example, the group includes a fifth preset condition, the first member meets the fifth preset condition, and the fifth preset condition includes at least one of the following conditions: the variation range of the positional information of the first member within a first preset time interval being smaller than a first preset positional variation range threshold; the positional coordinates of the first member being in a first coordinate range; the variation range of the positional information of the first member within a first preset time interval being smaller than a first preset positional variation range threshold; the data collection accuracy of the first member being greater than a first data collection accuracy threshold; the data collection frequency of the first member being greater than a first data collection frequency threshold; the number of references to data of the first member being larger than a first threshold of the number of references to data; and the communication signal intensity of the first member being greater than a first preset communication signal intensity.

For example, when the variation range of the positional information of the first member within the first preset time interval is smaller than the first preset positional variation range threshold, it indicates that the first member has a small activity range. When the first member is implemented as a device, the first member may usually be a stationary device.

For another example, when the data collection accuracy of the first member is greater than the first data collection accuracy threshold, and the collected data may be, for example, measurement data or detection data, it indicates that that when the first member is implemented as a device, the data collection accuracy such as measurement accuracy or detection accuracy thereof is high, and the first member may usually be a sophisticated device (such as a precision instrument).

For still another example, when the data collection frequency of the first member is greater than the first data collection frequency threshold, it indicates that the first member has a high data collection frequency. When the first member is implemented as a device, the first member may usually be a stationary device (with no power limitation), or a sophisticated device.

For still another example, when the data collection frequency of the first member is greater than the first data collection frequency threshold, it indicates that the first member has a high data generation frequency. Some platforms do not allow the created data to be modified, so new data needs to be created at that time. When the first member is implemented as a device, the first member may usually be a stationary device (with no power limitation), or a sophisticated device.

For still another example, when the number of references to data of the first member is larger than the first threshold of the number of references to data, it indicates that data of the first member is accessed a large number of times by other applications. When the first member is implemented as a device, the first member may be a sophisticated device with high data accuracy.

For still another example, when the communication signal intensity of the first member is greater than the first preset communication signal intensity, it indicates that when the first member is implemented as a communication device, the signal intensity thereof is high, and the first member may usually be a stationary device.

Of course, the first member may satisfy any two or more of the above screening conditions at the same time, which can be set as needed.

For example, the first member may simultaneously satisfy the two conditions that the variation range of the positional information within the first preset time interval is smaller than the first preset positional variation range threshold and the data collection accuracy is greater than the first data collection accuracy threshold. At that time, the first member may be implemented as a stationary device with high accuracy.

For example, the first preset time interval, the first preset positional variation range threshold, the first data collection accuracy threshold, the first data collection frequency threshold, the first threshold of the number of references to data, and the first preset communication signal intensity may all be set as needed, and the values thereof are not defined here.

For example, the information of the IoT device determined as the first member may be pre-stored in a management apparatus of the IoT device. For example, before being determined as the first member, the IoT device may send a registration request to the management apparatus of the IoT device. The management apparatus of the IoT device creates corresponding resources for the IoT device after verifying the registration request, and adds the IoT device as an object waiting for a group to be created after successful registration.

In some embodiments, the second member may correspond to any IoT device used to obtain information of persons, affairs and things. The screening condition for the second member is set as needed, which is related to the attributes or characteristics of the group, or is related to the purpose to be achieved by the group.

In this embodiment, the information of the IoT device determined as the second member may be pre-stored in the management apparatus of the IoT device. For example, the IoT device may send a registration request to the management apparatus of the IoT device in advance. The management apparatus of the IoT device creates corresponding resources for the IoT device after verifying the registration request, and takes the IoT device as a pending object of the group after successful registration.

In this embodiment, the second member may be any person, affair or thing. For example, the second member may be a device. The screening condition for the second member is set as needed, which is related to the attributes or characteristics of the group, or is related to the purpose to be achieved by the group.

For example, the group includes a sixth preset condition. The method further comprises determining, in response to receiving a group joining request from at least one IoT device of the plurality of IoT devices, whether the at least one IoT device that sends the group joining request meets the sixth preset condition, and if so, determining, from the at least one IoT device that meets the sixth preset condition, an IoT device whose relationship with the first member meets the first preset condition. The sixth preset condition satisfies at least one of the following conditions: the positional coordinates of the second member being in a second coordinate range; the variation range of the positional information of the second member within the first preset time interval being larger than a second preset positional variation range threshold; the data collection accuracy of the second member being less than a second data collection accuracy threshold; the data collection frequency of the second member being less than a second data collection frequency threshold; the number of references to the data of the second member being smaller than a second threshold of the number of references to data, and the communication signal intensity of the second member being less than a second preset communication signal intensity.

For example, when the variation range of the positional information of the second member within the first preset time interval is larger than the second preset positional variation range threshold, it indicates that the second member has a larger range of activities. When the second member is implemented as a device, the second member may usually be a mobile device.

For another example, when the device accuracy of the second member is less than the second data collection accuracy threshold, it indicates that when the second member is implemented as a device, the data collection accuracy such as measurement accuracy or detection accuracy thereof is low, and the measured data or detected data thereof is usually less accurate.

For still another example, when the data collection frequency of the second member is less than the second data collection frequency threshold, it indicates that the second member has a low data collection frequency. When the second member is implemented as a device, the second member may usually be a mobile device (with power limitation), or a less sophisticated device.

For still another example, when the data collection frequency of the second member is less than the second data collection frequency threshold, it indicates that the second member has a low data generation frequency. Some platforms do not allow the created data to be modified, so new data needs to be created at that time. When the second member is implemented as a device, the second member may usually be a mobile device (with power limitation), or a less sophisticated device.

For still another example, when the number of references to the data of the second member is smaller than the second threshold of the number of references to data, it indicates that the data collected by the second member is accessed a small number of times by other applications. When the second member is implemented as a device, the second member may be a less sophisticated device, and the data accuracy is low.

For still another example, when the communication signal intensity of the second member is less than a second preset communication signal intensity, it indicates that when the second member is implemented as a communication device, the signal intensity thereof is weak, and the second member may usually be an ordinary mobile device, such as a mobile phone or a mobile signal collector.

Of course, the second member may satisfy any two or more of the abovementioned screening conditions at the same time, which can be set as needed.

For example, the second member may simultaneously satisfy the two conditions that the variation range of the positional information within the first preset time interval is larger than the second preset positional variation range threshold and the data collection accuracy is less than the second data collection accuracy threshold. At that time, the second member may be implemented as a mobile device with low accuracy.

For example, the first preset time interval, the second preset positional variation range threshold, the second data collection accuracy threshold, the second data collection frequency threshold, the second threshold of the number of references to data, and the second preset communication signal intensity may all be set as needed, and the values thereof are not defined here. In some embodiments, the value of the second preset positional variation range threshold may be the same as the value of the first preset positional variation range threshold. In some embodiments, the second data collection accuracy threshold may also be the same as the first data collection accuracy threshold. In some embodiments, the first data collection frequency threshold may also be the same as the second data collection frequency threshold. In some embodiments, the first threshold of the number of references to data may also be the same as the second threshold of the number of references to data. In some embodiments, the second preset communication signal intensity may also be the same as the first preset communication signal intensity.

For example, the first preset condition may be that the distance between the second member and the first member is less than the first distance threshold. In this embodiment, the fifth preset condition that the first member satisfies may be the variation range of the positional information of the first member within the first preset time interval being smaller than the first preset positional variation range threshold, and the sixth preset condition that the second member satisfies may be the variation range of the positional information of the second member within the first preset time interval being larger than the second preset positional variation range threshold. In this way, the distance is taken as a criterion for creating a group, so that devices within a certain positional range can be aggregated, which facilitates data interaction and adjustment of members in a group.

Of course, the first preset condition may also be other conditions, which can be selected as needed. For example, the difference between the communication signal intensity of the second member and the communication signal intensity of the first member is less than the first intensity difference threshold. At that time, the second member and the first member may be close to each other or have similar communication characteristics. Therefore, the two members may be considered to be classified into the same group.

In this embodiment, the first preset condition is a condition for determining whether the second member can be added to the group, and the condition may be set as needed, which is not limited here.

For example, the group further includes the second preset condition.

In an embodiment, the method further comprises: after determining the second member, determining whether the relationship between the first member and the second member satisfies the second preset condition, and if so, adjusting the second configuration information of the second member according to the first configuration information of the first member. The second preset condition is: the device types to which the first member and the second member correspond being the same or similar; and/or the data types to which the first member and the second member correspond being the same or similar.

As a result, it can be ensured that when the first configuration information of the first member is subsequently used to modify and adjust the second configuration information of the second member, a better reference basis can be provided.

In this embodiment, the device types being similar may indicate that the device types somewhat overlap each other, for example, the devices have some identical functions. The data types being similar may indicate that data collected or processed by devices somewhat overlap each other. For example, for environmental monitoring devices, some devices are capable of detecting PM2.5, while some devices are capable of detecting both PM2.5 and sulfur content. These two types of devices belong to devices with similar data types.

In some embodiments, the group further includes a fourth preset condition, and the fourth preset condition includes at least one of the following conditions: the data collection accuracy of the first member being greater than the data collection accuracy of the second member; the data collection frequency of the first member being greater than the data collection frequency of the second member; the number of references to the data of the first member being larger than the number of references to the data of the second member; and the communication signal intensity of the first member being greater than the communication signal intensity of the second member.

It can be seen from the above embodiment that the method for managing an IoT device provided by this embodiment creates a group including a first member, and then determines whether to add a second member to the group based on whether the second member meets the first preset condition. In this way, by creating a group, a dynamic member is incorporated into the group by means of determination according to preset conditions. Using such an aggregation manner on a group basis, calculation may be performed on a group basis when data is being processed. This can avoid calculation of relationship data between all members in the network, but needs to perform calculation of the relationships between members in a group on a group basis, which greatly improves the overall operation efficiency.

In addition, for adjustment of configuration information of each member in a group, a calculation method on a group basis is also adopted. This can avoid adjustment of configuration information of all members in the network, but needs to adjust configuration information of members in a group, which greatly improves the overall operation efficiency.

For example, for a network composed of N groups, the second member in each group needs to be adjusted according to the configuration information of the first member in the group without referring to the first members in other groups. Therefore, contents are all calculated on a group basis, and no calculation is performed between groups, which greatly reduces the calculation resources and improves the calculation efficiency. For example, the group further includes a third preset condition. The method further comprises: after the second member is added to the group, deleting the second member from the group when it is determined that the second member satisfies the third preset condition.

For example, the third preset condition includes at least one of the following conditions: the distance between the second member and the first member being greater than a second distance threshold; and the difference between the communication signal intensity of the second member and the communication signal intensity of the first member being greater than a second intensity difference threshold.

For example, the group further includes a seventh preset condition. The method further comprises: acquiring data collected by the first member and data collected by the second member; when it is determined that the relationship between the data collected by the first member and the data collected by the second member satisfies the seventh preset condition, adjusting the second configuration information of the second member according to the first configuration information of the first member. The seventh preset condition is the difference between the data collected by the second member and the data collected by the first member being greater than a data difference threshold.

For example, the management apparatus of an IoT device is applied to the environmental monitoring field, the data collected is environmental monitoring data, and the seventh preset condition is the difference between the environmental monitoring data of the second member and the environmental monitoring data of the first member being greater than a preset monitoring data difference threshold.

For example, the monitoring device management system is applied to the environmental monitoring field, the data collected is environmental monitoring data, and the seventh preset condition is the accuracy of the environmental monitoring data of the first member being greater than the first preset accuracy threshold, and the accuracy of the environmental monitoring data of the second member being less than the second preset accuracy threshold.

For example, the first member has a first authority, the second member has a second authority, and the first authority is higher than the second authority.

For example, the first member has a control authority over the second member, and the second member does not have a control authority over the first member.

For example, as shown in FIG. 2, the management apparatus of an IoT device further comprises a transmitter 104, and the apparatus is used to realize the function of the first member. By disposing the transmitter 104, the management apparatus of the IoT device can realize data transmission, and further realize the function of the first member. That is, not only a group can be created, but also members in the group can be operated, controlled, etc.

Figure 3:
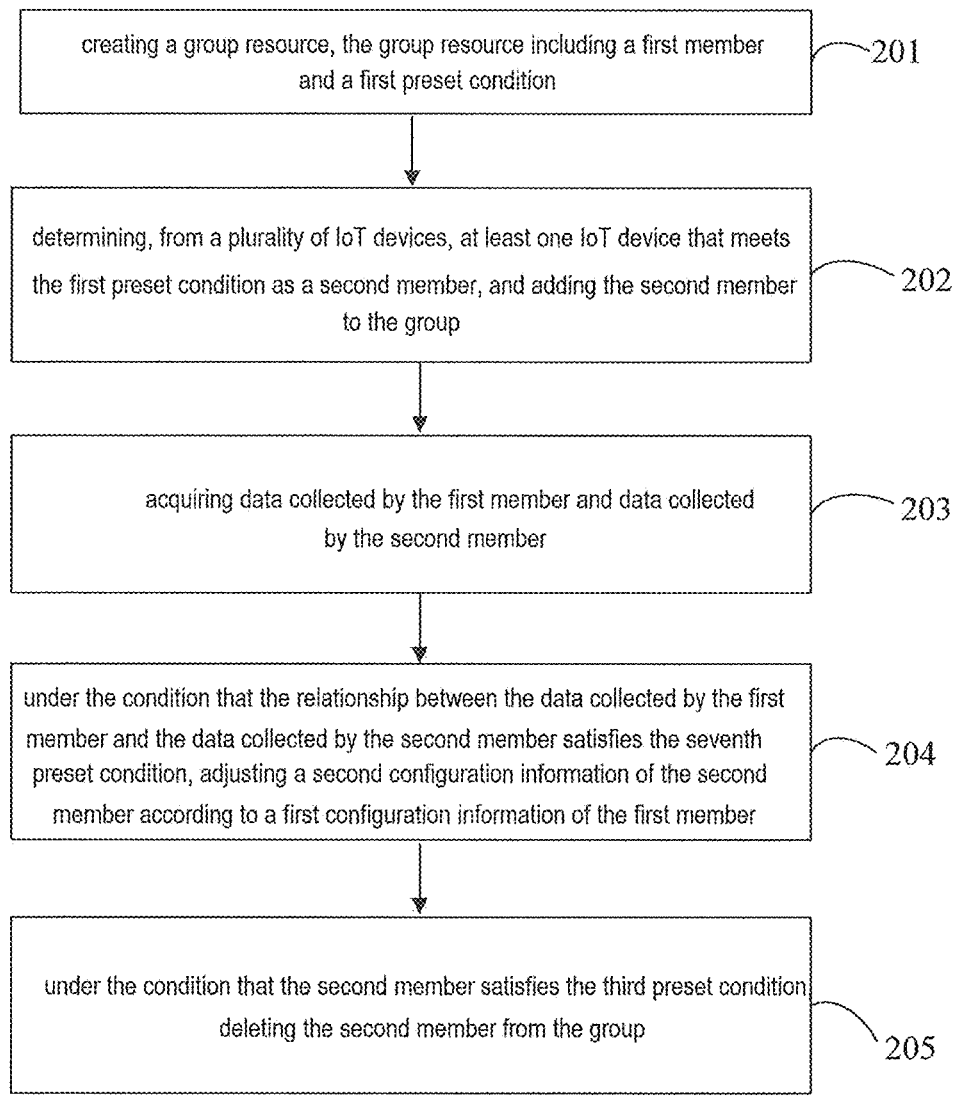
FIG. 3 is a flow chart of an embodiment of a method for managing an IoT device provided by the present disclosure.

FIG. 3 illustrates a flow chart of an embodiment of a method for managing an IoT device provided by the present disclosure.

As shown in FIG. 3, the method for managing an IoT device is applied to the management device of the IoT device (the apparatus may be implemented as a server). The method may comprise the following steps.

Step 201: creating a group, the group including a first member and a first preset condition.

In this step, the group may refer to a group whose members are in a dynamically adjusting state, that is, the members therein are not static, but can be added or deleted according to actual needs and changes. For example, the number of the first member may be one or multiple.

For example, the request for creating a group may be from the first member, or may be generated spontaneously by the management apparatus of the IoT device. In a scenario where there are multiple first members, a group may be created for each first member, or the first members may be classified into multiple categories according to the characteristics of the first members, and then the first members of the same category are created in one group. The creation method can be set as needed, which will not be described here for simplicity.

In this step, the first member refers to one type of members in a group to be created, and the first member may correspond to any IoT device used to obtain information of persons, affairs and things. The screening condition for the first member is set as needed, which is related to the attributes or characteristics of the group that needs to be created, or is related to the purpose to be achieved by the group that needs to be created.

For example, the group further includes a fifth preset condition, and the IoT device determined as the first member needs to meet the fifth preset condition. The fifth preset condition includes at least one of the following conditions: the variation range of the positional information of the first member in the first preset time interval being smaller than the first preset positional variation range threshold; the positional coordinates of the first member being in the first coordinate range; the variation range of the positional information of the first member within the first preset time interval being smaller than the first preset positional variation range threshold; the data collection accuracy of the first member being greater than the first data collection accuracy threshold; the data collection frequency of the first member being greater than the first data collection frequency threshold; the number of references to data of the first member being larger than the first threshold of the number of references to data; and the communication signal intensity of the first member being greater than the first preset communication signal intensity.

For example, when the variation range of the positional information of the first member within the first preset time interval is smaller than the first preset positional variation range threshold, it indicates that the first member has a small activity range. When the first member is implemented as a device, the first member may usually be a stationary device.

For another example, when the data collection accuracy of the first member is greater than the first data collection accuracy threshold, and the collected data may be, for example, measurement data or detection data, it indicates that when the first member is implemented as a device, the data collection accuracy such as measurement accuracy or detection accuracy thereof is high, and the first member may usually be a sophisticated device (such as a precision instrument).

For still another example, when the data collection frequency of the first member is greater than the first data collection frequency threshold, it indicates that the first member has a high data collection frequency. When the first member is implemented as a device, the first member may usually be a stationary device (with no power limitation), or a sophisticated device.

For still another example, when the data collection frequency of the first member is greater than the first data collection frequency threshold, it indicates that the first member has a high data generation frequency. Some platforms do not allow the created content information to be modified, so new data needs to be created at that time. When the first member is implemented as a device, the first member may usually be a stationary device (with no power limitation), or a sophisticated device.

For still another example, when the number of references to the data of the first member is larger than the first threshold of the number of references to data, it indicates that the data collected by the first member is accessed a large number of times by other applications. When the first member is implemented as a device, the first member may be a sophisticated device with high data accuracy.

For still another example, when the communication signal intensity of the first member is greater than the first preset communication signal intensity, it indicates that when the first member is implemented as a communication device, the signal intensity thereof is high, and the first member may usually be a stationary device.

Of course, the first member may satisfy any two or more of the abovementioned screening conditions at the same time, which can be set as needed.

For example, the first member may simultaneously satisfy the two conditions that the variation range of the positional information within the first preset time interval is smaller than the first preset positional variation range threshold and the data collection accuracy is greater than the first data collection accuracy threshold. At that time, the first member may be implemented as a stationary device with high accuracy.

For example, the first preset time interval, the first preset positional variation range threshold, the first data collection accuracy threshold, the first data collection frequency threshold, the first threshold of the number of references to data, and the first preset communication signal intensity may all be set as needed, and the values thereof are not defined here.

For example, the information of the IoT device determined as the first member may be pre-stored in the management apparatus of an IoT device. For example, before being determined as the first member, the IoT device may send a registration request to the management apparatus of an IoT device. The management apparatus of an IoT device creates corresponding resources for the IoT device after verifying the registration request, and adds the IoT device as an object waiting for a group to be created after successful registration.

Step 202: determining, from a plurality of IoT devices, at least one IoT device that meets the first preset condition as a second member, and adding the second member to the group.

In this step, the information of the at least one IoT device determined as the second member may be pre-stored in the management apparatus of an IoT device. For example, the at least one IoT device may send a registration request to the management apparatus of an IoT device in advance. The management apparatus of an IoT device creates corresponding resources for the at least one IoT device after verifying the registration request, and takes the at least one IoT device as a pending object of the group after successful registration.

In some embodiments, the second member may be any person, affair or thing, for example, the second member may be a device. The screening condition for the second member is set as needed, which is related to the attributes or characteristics of the group, or is related to the purpose to be achieved by the group.

For example, the group further includes a sixth preset condition. The method comprises: determining, in response to receiving a group joining request from at least one IoT device of the plurality of IoT devices, whether the at least one IoT device that sends the group joining request meets the sixth preset condition, and if so, determining, from the at least one IoT device that meets the sixth preset condition, an IoT device whose relationship with the first member meets the first preset condition. The sixth preset condition satisfies at least one of the following conditions: the positional coordinates of the second member being in a second coordinate range; the variation range of the positional information of the second member within the first preset time interval being larger than the second preset positional variation range threshold; the data collection accuracy of the second member being less than the second data collection accuracy threshold; the data collection frequency of the second member being less than the second data collection frequency threshold; the number of references to the data of the second member being smaller than the second threshold of the number of references to data, and the communication signal intensity of the second member being less than the second preset communication signal intensity.

For example, when the variation range of the positional information of the second member within the first preset time interval is larger than the second preset positional variation range threshold, it indicates that the second member has a large activity range. When the second member is implemented as a device, the second member may usually be a mobile device.

For another example, when the device accuracy of the second member is less than the second data collection accuracy threshold, it indicates that when the second member is implemented as a device, the data collection accuracy such as measurement accuracy or detection accuracy thereof is low, and the measured data or detected data thereof is usually less accurate.

For still another example, when the data collection frequency of the first member is less than the second data collection frequency threshold, it indicates that the first member has a low data collection frequency. When the first member is implemented as a device, the first member may usually be a mobile device (with power limitation), or a less sophisticated device.

For still another example, when the data collection frequency of the first member is less than the second data collection frequency threshold, it indicates that the first member has a low data generation frequency. Some platforms do not allow the created content information to be modified, so new data needs to be created at that time. When the first member is implemented as a device, the first member may usually be a mobile device (with power limitation), or a less sophisticated device.

For still another example, when the number of references to the data of the first member is smaller than the second threshold of the number of references to data, it indicates that the data collected by the first member is accessed a small number of times by other applications. When the first member is implemented as a device, the first member may be a less sophisticated device with low data accuracy.

For still another example, when the communication signal intensity of the second member is less than the second preset communication signal intensity, it indicates that when the second member is implemented as a communication device, the signal intensity thereof is weak, and the second member may usually be an ordinary mobile device, such as a mobile phone or a mobile signal collector.

Of course, the second member may satisfy any two or more of the abovementioned screening conditions at the same time, which can be set as needed.

For example, the second member may simultaneously satisfy the two conditions that the variation range of the positional information within the first preset time interval is larger than the second preset positional variation range threshold and the data collection accuracy is less than the second data collection accuracy threshold. At that time, the second member may be implemented as a mobile device with low accuracy.

For example, the first preset time interval, the second preset positional variation range threshold, the second data collection accuracy threshold, the second data collection frequency threshold, the second threshold of the number of references to data, and the second preset communication signal intensity may all be set as needed, and the values thereof are not defined here. In some embodiments, the value of the second preset positional variation range threshold may be the same as the value of the first preset positional variation range threshold. In some embodiments, the second data collection accuracy threshold may also be the same as the first data collection accuracy threshold. In some embodiments, the first data collection frequency threshold may also be the same as the second data collection frequency threshold. In some embodiments, the first threshold of the number of references to data may also be the same as the second threshold of the number of references to data. In some embodiments, the second preset communication signal intensity may also be the same as the first preset communication signal intensity.

For example, the first preset condition may be that the distance between the second member and the first member is less than the first distance threshold. In this embodiment, the fifth preset condition that the first member satisfies may be the variation range of the positional information of the first member within the first preset time interval being smaller than the first preset positional variation range threshold, and the sixth preset condition that the second member satisfies may be the variation range of the positional information of the second member within the first preset time interval being larger than the second preset positional variation range threshold. In this way, the distance is taken as a criterion for creating a group, so that devices within a certain positional range can be aggregated, which facilitates data interaction and adjustment of members in a group.

Of course, the first preset condition may also be other conditions, which can be selected as needed. For example, the difference between the communication signal intensity of the second member and the communication signal intensity of the first member is less than the first intensity difference threshold. At that time, the second member and the first member may be close to each other or have similar communication characteristics. Therefore, the two members may be considered to be classified into the same group.

In this step, the first preset condition is a condition for determining whether the second member can be added to the group, and the condition may be set as needed, which is not limited here.

For example, the group further includes the second preset condition.

In an embodiment, the method further comprises: after determining the second member, determining whether the relationship between the first member and the second member satisfies the second preset condition, and if so, adjusting the second configuration information of the second member according to the first configuration information of the first member. The second preset condition is: the device types to which the first member and the second member correspond being the same or similar; and/or the data types to which the first member and the second member correspond being the same or similar.

In this embodiment, the device types being similar may indicate that the device types somewhat overlap each other, for example, the devices have some identical functions. The data types being similar may indicate that data collected or processed by devices somewhat overlap each other. For example, for environmental monitoring devices, some devices are capable of detecting PM2.5, while some devices are capable of detecting both PM2.5 and sulfur content. These two types of devices belong to devices with similar data types.

In some embodiments, the group further includes a fourth preset condition, and the fourth preset condition includes at least one of the following conditions: the data collection accuracy of the first member being greater than the data collection accuracy of the second member; the data collection frequency of the first member being greater than the data collection frequency of the second member; the number of references to the data of the first member being larger than the number of references to the data of the second member; and the communication signal intensity of the first member being greater than the communication signal intensity of the second member.

In some embodiments, when the second member does not meet the first preset condition, the second member cannot join the group where the first member belongs, but the second member may be able to join other groups. For this or these second members that cannot be added to the group where the first member belongs, other operations may be performed thereon subsequently.

For example, the group further includes a seventh preset condition. As shown in FIG. 3, the method may further comprise step 203: acquiring data collected by the first member and data collected by the second member.

In this step, the data collected by the first member and the data collected by the second member belong to the same type of data, and the data thereof can be compared with each other. For example, when the first member and the second member are measurement devices, the data may be measurement data; when the first member and the second member are detection devices, the data may be detection data, and so on.

Step 204: if the relationship between the data collected by the first member and the data collected by the second member satisfies the seventh preset condition, adjusting the second configuration information of the second member according to the first configuration information of the first member.

In this step, the seventh preset condition is a condition for determining whether the second configuration information of the second member needs to be adjusted according to the first configuration information of the first member, and the condition may be selected as needed, which is not limited here.

For example, the seventh preset condition is that the difference between the data collected by the second member and the data collected by the first member is greater than a data difference threshold. As a result, when the difference between the data collected by the second member and the data collected by the first member is greater than the data difference threshold (valued as needed), the second configuration information of the second member can be adjusted according to the first configuration information of the first member. In other embodiments, it is also possible to control the authority of the second member, limit the operation range of the second member, and so on.

In this way, the second configuration information of the second member is adjusted according to the first configuration information of the first member, so that the second configuration information of all the second members whose information is inaccurate is adjusted by taking the first configuration information of the first member as a reference, which ensures the unity and stability of members in a group.

For example, the first member may have a first authority, the second member may have a second authority, and the first authority is higher than the second authority. For example, when the two authorities are different, a member with higher authority can perform operation, control, etc. on a member with lower authority.

In some embodiments, if the relationship between the data collected by the first member and the data collected by the second member does not satisfy the seventh preset condition, the second configuration information of the second member is not adjusted. At that time, the data collected by the second member may be accurate, or the data collected by the first member is not much different from the data collected by the second member, thus there is no need to adjust the second configuration information of the second member.

As an implementing manner, the group further includes a third preset condition. As shown in FIG. 3, the method may further comprise the following steps.

Step 205: after the second member is added to the group, if the second member satisfies the third preset condition, deleting the second member from the group to ensure the dynamic of the group, so that the members therein can cooperate and coordinate with each other under preset conditions.

For example, the third preset condition may be that the distance between the second member and the first member is greater than a second distance threshold. In this embodiment, the fifth preset condition that the first member meets may be the variation range of the positional information of the first member within the first preset time interval being smaller than the first preset positional variation range threshold, and the sixth preset condition that the second member meets may be the variation range of the positional information of the second member within the first preset time interval is larger than the second preset positional variation range threshold. In this way, the distance is taken as a criterion for creating a group, so that devices beyond a certain positional range can be deleted from the group, thereby ensuring the dynamic characteristics of the group and the accuracy of data calibration.

Of course, the third preset condition may also be other conditions, which can be selected as needed. For example, the difference between the communication signal intensity of the second member and the communication signal intensity of the first member is greater than a second intensity difference threshold. At that time, the second member and the first member may be remote from each other or have quite different communication characteristics. Therefore, the second member may be considered to be deleted from the group.

It can be seen from the above embodiment that the group implementation method provided by this embodiment creates a group including a first member, and then determines whether to add a second member to the group according to whether the second member meets the first preset condition. In this way, by creating a group, a dynamic member is incorporated into the group by means of determination according to preset conditions. Using such an aggregation manner on a group basis, calculation may be performed on a group basis when data is being processed. This can avoid calculation of relationship data between all members in the network, but needs to perform calculation of the relationships between members in a group on a group basis, which greatly improves the overall operation efficiency.

In addition, for adjustment of configuration information of each member in a group, a calculation method on a group basis is also adopted. This can avoid adjustment of configuration information of all members in the network, but needs to adjust configuration information of members in a group, which greatly improves the overall operation efficiency.

For example, for a network composed of N groups, the second configuration information of the second member in each group needs to be adjusted according to the first configuration information of the first member in the group without referring to the first members of other groups. Therefore, contents are all calculated on a group basis, and no calculation is performed between groups, which greatly reduces the calculation resources and improves the calculation efficiency.

For example, the method is applied to monitoring device management, and the first member and the second member are both monitoring devices, so that monitoring device management can be realized using the IoT technology, which facilitates management of monitoring devices.

Figure 4A:
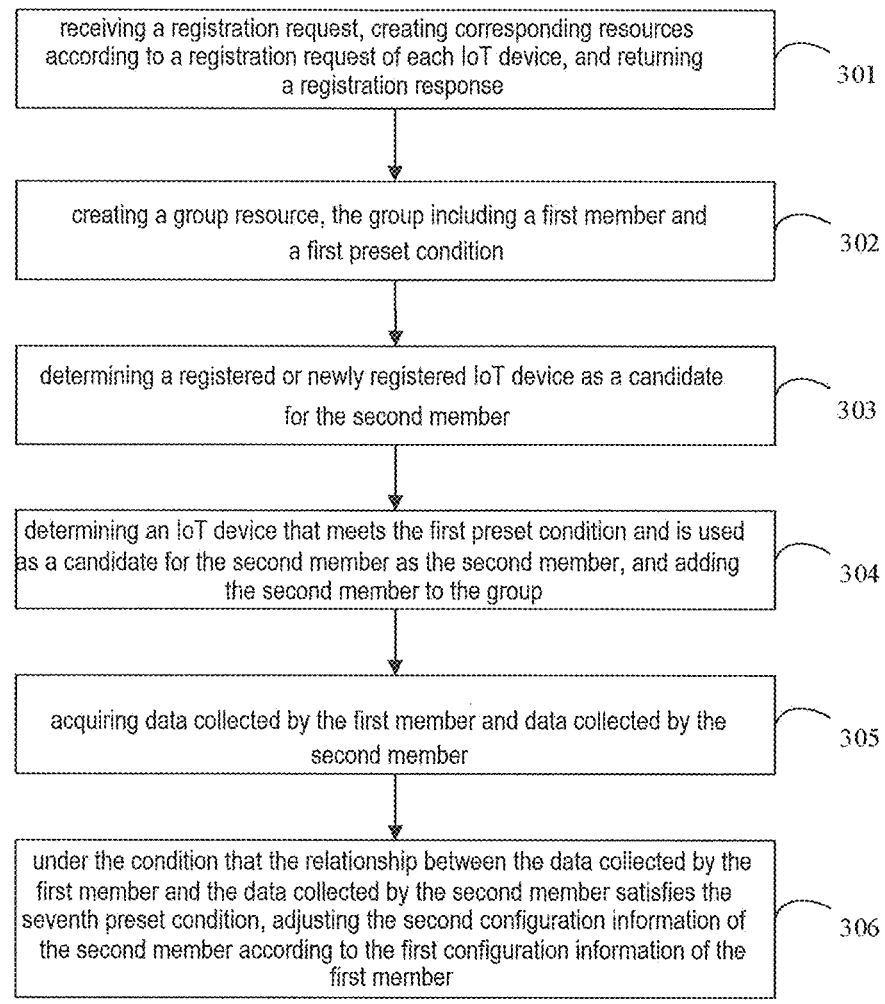
FIG. 4A is a flow chart of another embodiment of a method for managing an IoT device provided by the present disclosure.

FIG. 4A illustrates a flow chart of another embodiment of a method for managing an IoT device provided by the present disclosure.

As shown in FIG. 4A, the method is, for example, applied to a management apparatus of an IoT device (the apparatus may be implemented as a server), and the method may comprise the following steps.

Step 301: receiving a registration request, creating corresponding resources according to a registration request of each IoT device, and returning a registration response.

In this step, the registration request may come from each IoT device requesting to join the group creation process. The registration request of each IoT device may not be sent at the same time. According to the time when each IoT device sends a registration request, the range of IoT devices that needs to be considered at the time of creating a group is different. For example, if a certain IoT device has not been registered, processing of the IoT device may not be considered at the time of creating a group.

Step 302: creating a group, the group including a first member and a first preset condition.

In this step, the step of determining the first member and the step of creating a group can be performed simultaneously or in sequence. If there is a sequence, it is possible to first determine the first member and then create a group, or first create a group and then determine the first member. The implementing manner may be set as needed.

For example, before creating a group, the request for creating a group may be sent by the first member or may be initiated by the management apparatus of an IoT device. The initiator may be selected as needed without special limitation. In addition, if the request for creating a group is sent by the first member, after the group is created, a response that creation is finished needs to be sent to the first member.

Figure 4B:
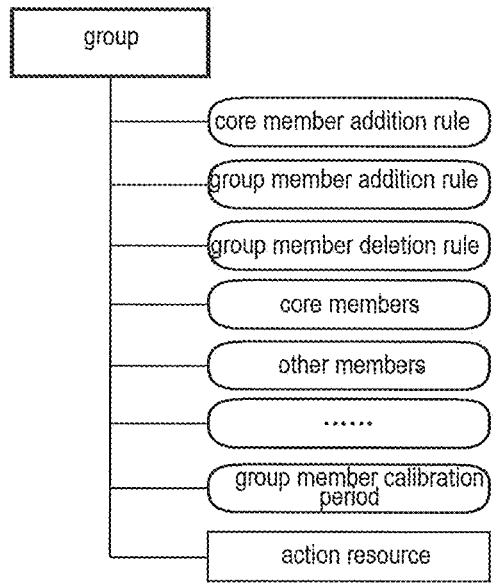
FIG. 4B is a schematic structural view of a group in an embodiment of the present disclosure.
Figure 4C:
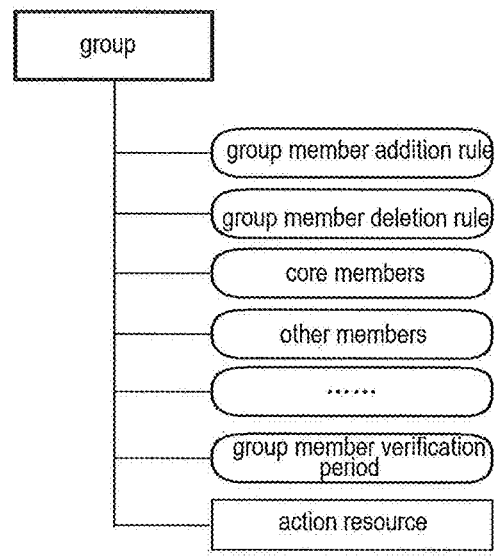
FIG. 4C is a schematic structural view of another group in an embodiment of the present disclosure.

For example, at the time of creating a group, a group resource needs to be created. As shown in FIG. 4B or 4C, the group resource includes a first member/second member addition rule, a first member/second member deletion rule, an action resource, and the like. The action resource is used to define an operation on the second member. The action resource may include a trigger condition and an operation, for example, when the trigger condition is met, an operation request is sent to the second member.

For example, the second member addition rule may include two parts: one is that the position or distance between the second member and the first member is less than a certain threshold; the other is that the second member and the first member have similar device types and/or the second member and the first member have similar types of information collected. The first member addition rule may be detailed, and the second member addition rule may be vague, in which the second member needs to have the same or similar device type as the first member and/or have the same or similar data type as the first member.

Step 303: determining a registered or newly registered IoT device as a candidate for the second member.

For example, at the time of creating a group, all registered IoT devices are used as candidates for the second member.

For another example, after the group has been created, if there is a newly registered IoT device, the newly registered IoT device can be used as a candidate for the second member.

Step 304: determining an IoT device that meets the first preset condition and is used as a candidate for the second member as the second member, and adding the second member to the group.

Step 305: acquiring data collected by the first member and data collected by the second member.

Step 306: if the relationship between the data collected by the first member and the data collected by the second member satisfies the seventh preset condition, adjusting the second configuration information of the second member according to the first configuration information of the first member.

In this embodiment, the steps of collecting data and determining whether the preset condition is met may be performed at regular intervals, or in real time.

It can be seen from the above embodiment that the method provided in this embodiment creates a group with the first member as the core, then determines whether to add the second member to the group according to whether the positional relationship between the second member and the first member meets the first preset condition, and after adding the second member, adjusts the second configuration information of the second member according to whether the relationship between the data collected by the first member and the data collected by the second member meets the seventh preset condition. In this way, by creating a group, a dynamic member is incorporated into the group by means of determination according to preset conditions, and data calibration of all members in the network is realized on a group basis by taking the first configuration information of the first member as a reference. Such a data calibration method on a group basis can avoid calculation of relationship data between all members in the network, but performs calculation of the relationships between members in a group and carries out data calibration, which greatly improves the overall operation efficiency.

Figure 5A:
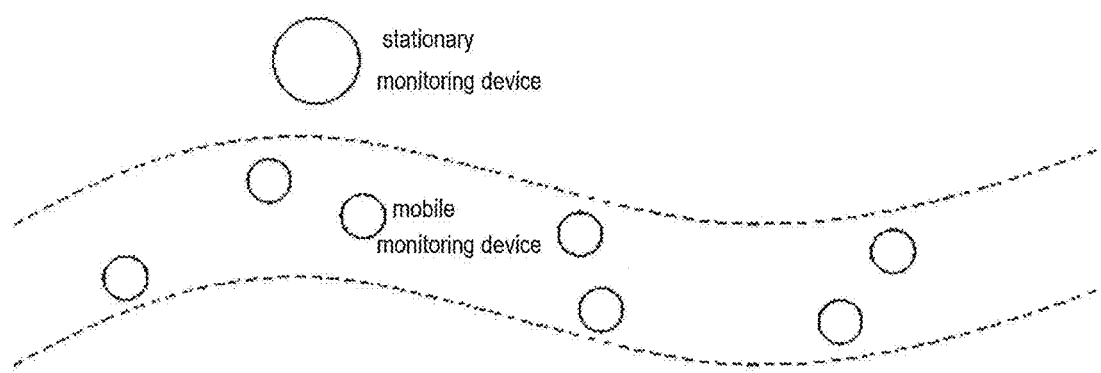
FIG. 5A is a schematic view illustrating a device distribution in the environmental monitoring field.

FIG. 5A shows a schematic view illustrating device distribution in the environmental monitoring field. As shown in FIG. 5A, in the environmental monitoring field, in order to achieve dynamic detection of environmental data, the environmental monitoring system will deploy a stationary monitoring device and a mobile monitoring device. The stationary monitoring device is usually set at some fixed monitoring sites or monitoring stations, which generally has high accuracy. Since the stationary monitoring device has a fixed position, the monitoring data thereof usually reflects environmental data within a certain range centered thereon, so the monitoring data is not comprehensive enough. In order to obtain comprehensive environmental monitoring data, a mobile monitoring device with an unfixed position may also be set for monitoring environmental data in a movable manner. However, since the mobile monitoring device needs to be moved, it is usually not suitable to install a device with large size, but to install a relatively portable device. However, the reduction in size indicates that the mobile monitoring device has low accuracy. Therefore, the mobile monitoring device needs to be calibrated regularly to ensure the data accuracy of the mobile monitoring device. Otherwise, in case the mobile monitoring device is not calibrated, the utility of the detected data will be greatly reduced.

For this scenario, when the members of a group may be dynamic or partially dynamic, since the members may move over a large distance, it will be difficult for the group created based on the distance to perform the originally desired function. For example, in an environment monitoring scenario, the monitoring data within a certain range reflects the environmental quality of a certain region. If the moving distance of the mobile device exceeds this range, the collected data will not reflect the environmental quality of the region where the group is located. At the same time, since the identities and responsibilities of members in the same group in related arts are treated equally, it is difficult for related arts to distinguish when members may have different identities or different responsibilities.

Figure 5B:
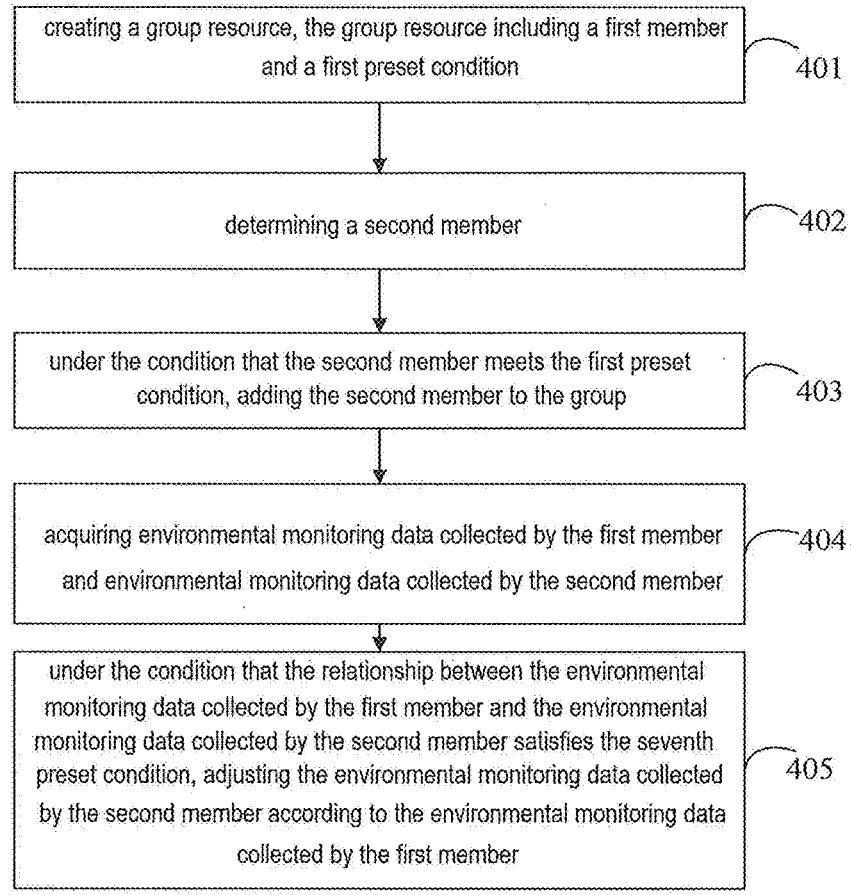
FIG. 5B is a flow chart of a further embodiment of a method for managing an IoT device provided by the present disclosure.

In order to solve the problem of inaccurate data existing in a mobile detection device, it is necessary to calibrate the device. FIG. 5B shows a flow chart of a further embodiment of the method provided by the present disclosure.

As shown in FIG. 5B, a method for managing an IoT device applied to the field of environmental monitoring field may comprise the following steps.

Step 401: creating a group, the group including a first member and a first preset condition. The variation range of the positional information of the first member within the first preset time interval is smaller than the first preset positional variation range threshold, and the data collection accuracy of the first member is greater than the first data collection accuracy threshold.

For example, the first member is a stationary device for environmental monitoring, as shown in FIG. 4C.

Step 402: determining a second member. The variation range of the positional information of the second member within the first preset time interval is larger than the second preset positional variation range threshold, and the device accuracy of the second member is less than the second preset accuracy threshold. For example, the second member is a mobile device for environmental monitoring.

Step 403: adding the second member to the group if the second member meets the first preset condition.

Figure 5C:
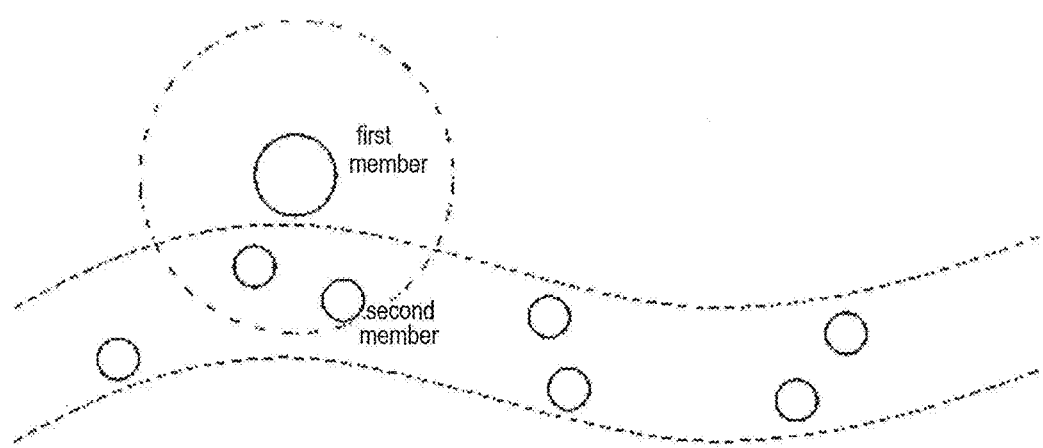
FIG. 5C is a schematic view when members of a group include a stationary device and a mobile device according to an embodiment of the present disclosure.

The first preset condition is that the distance between the second member and the first member is less than the first distance threshold. For example, the second member is a mobile device for environmental monitoring. For example, the second member is a monitoring device installed on a vehicle, as shown in FIG. 5C.

For example, the step of obtaining the second member may be performed at a predetermined time interval. For example, if the second member is a mobile device, when it moves to the vicinity of the first member, the second member can be added to the group for subsequent data calibration.

For example, the first member has a first authority, the second member has a second authority, and the first authority is higher than the second authority. The first member can control and operate the second member.

Step 404: acquiring environmental monitoring data collected by the first member and environmental monitoring data collected by the second member.

Step 405: if the relationship between the environmental monitoring data collected by the first member and the environmental monitoring data collected by the second member satisfies the seventh preset condition, adjusting the environmental monitoring data collected by the second member according to the environmental monitoring data collected by the first member.

For example, the accuracy of the environmental monitoring data of the first member is greater than a first preset accuracy threshold, and the accuracy of the environmental monitoring data of the second member is less than a second preset accuracy threshold; and/or the seventh preset condition is that the difference between the environmental monitoring data collected by the second member and the environmental monitoring data collected by the first member is greater than a preset monitoring data difference threshold.

For example, the environmental monitoring data may be air quality detection data, such as PM2.5, sulfur content, ozone content, carbon monoxide content, carbon dioxide content, and so on.

It can be seen from the above embodiment that the method for managing an IoT device provided by this embodiment performs calibration of the data collected by the second member with the data collected by the first member by utilizing the interval during which the second member moves to the vicinity of the first member, so that the accuracy of data subsequently collected by the second member is improved to better realize environmental monitoring. In addition, by classifying the first member as a stationary device and classifying the second member as a mobile device, the stationary device and the mobile device in the network can work together to improve the accuracy and comprehensiveness of environmental monitoring.

Figure 5D:
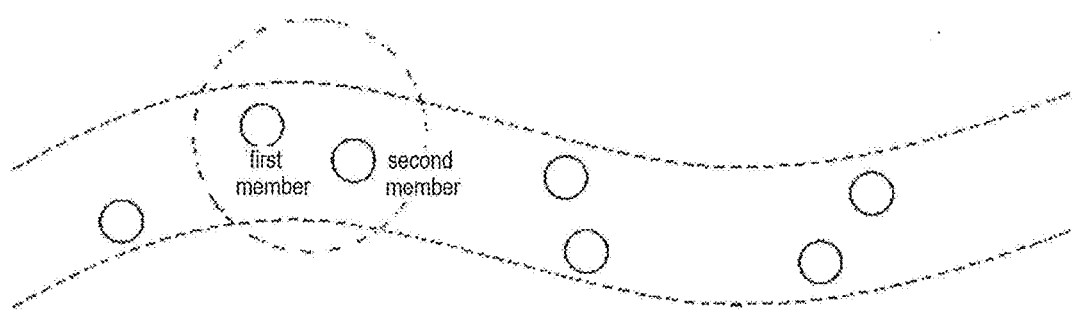
FIG. 5D is a schematic view when members of a group are all mobile devices according to an embodiment of the present disclosure.

As an embodiment, as shown in FIG. 5D, the first member may also be a mobile device. When the device has high accuracy, the effect of performing data calibration on the second member can also be achieved.

An embodiment of the present application provides a non-transitory computer storage medium that stores computer executable instructions, and the computer executable instructions can execute a processing method operated by the list items in any of the foregoing method embodiments. The embodiment of the non-transitory computer storage medium has the same or similar technical effect as any of the foregoing method embodiments.

Finally, it is to be noted that a person having an ordinary skill in the art can understand that all or part of the procedures in the abovementioned embodiment methods may be carried out by relevant hardware instructed by a computer program. The program may be stored in a computer readable storage medium. The program, when executed, may include the procedures of the abovementioned method embodiments. The storage medium may be a magnetic disk, an optical disc, a read-only memory (ROM), or a random access memory (RAM), etc. The embodiment of the computer program has the same or similar technical effect as any of the foregoing method embodiments.

In addition, the apparatus, device, etc. described in the present disclosure may be various electronic terminal devices, such as a mobile phone, a personal digital assistant (PDA), a tablet computer (PAD), a smart TV and the like, or large-scale terminal devices, such as a server and the like. Therefore, the protection scope of the present disclosure should not be limited to a specific type of apparatus and device. The client described in the present disclosure may be applied to any of the abovementioned electronic terminal devices in the form of electronic hardware, computer software, or a combination thereof.

In addition, the method according to the present disclosure may also be implemented as a computer program executed by a CPU, and the computer program may be stored in a computer readable storage medium. When the computer program is executed by the CPU, the above functions defined in the method of the present disclosure are executed.

In addition, the above method steps and system units may also be implemented using a controller and a computer readable storage medium for storing a computer program that enables the controller to implement the above steps or unit functions.

In addition, it is to be understood that the computer readable storage medium (e.g. memory) described herein may be a volatile memory or non-volatile memory, or may include both a volatile memory and a non-volatile memory. As an example and not limitation, the non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM), which can act as external cache memory. As an example and not limitation, the RAM may be obtained in various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct RambusRAM (DRRAM). The storage devices of the disclosed aspects are intended to include, but are not limited to, these and other suitable types of memories.

Those skilled in the art will also appreciate that the various exemplary logic blocks, modules, circuits, and algorithm steps described in conjunction with the disclosure herein may be implemented as electronic hardware, computer software, or a combination thereof. In order to clearly explain the interchangeability of hardware and software, various illustrative components, blocks, modules, circuits and functions of steps have been described in general terms. Whether the functions are implemented as software or hardware depends on the applications and design constraints imposed on the entire system. Those skilled in the art can implement the described functions in various ways for each application, but such implementation decisions should not be construed as causing a departure from the scope of the present disclosure.

The various exemplary logic blocks, modules, and circuits described in conjunction with the disclosure herein may be implemented or executed using the following components designed to perform the functions described herein: a general-purpose processor, a digital signal processor (DSP), a dedicated integrated circuit (ASIC), a field programmable gate array (FPGA) or other programmable logic devices, a discrete gate or transistor logic, discrete hardware components, or any combination of these components. The general-purpose processor may be a microprocessor, but in the alternative, the processor may be any conventional processor, controller, microcontroller, or state machine. The processor may also be implemented as a combination of computing devices, for example, a combination of a DSP and a microprocessor, multiple microprocessors, one or more microprocessors combined with a DSP core, or any other such configuration.

The steps of the method or algorithm described in combination with the disclosure herein may be directly included in hardware, a software module executed by a processor, or a combination thereof. The software module may reside in an RAM memory, a flash memory, an ROM memory, an EPROM memory, an EEPROM memory, a register, a hard disk, a removable disk, a CD-ROM, or any storage medium in other forms known in the art. An exemplary storage medium is coupled to a processor such that the processor can read information from or write information to the storage medium. In an alternative, the storage medium may be integrated with the processor. The processor and the storage medium may reside in an ASIC. The ASIC may reside in the user terminal. In an alternative, the processor and the storage medium may reside as discrete components in the user terminal.

In one or more exemplary designs, the functions described may be implemented in hardware, software, firmware, or any combination thereof. If implemented in software, the functions may be stored as one or more instructions or codes on a computer readable medium or transmitted through the computer readable medium. The computer readable medium includes a computer storage medium and a communication medium including any medium that facilitates the transfer of a computer program from one location to another. A storage medium may be any available medium that can be accessed by a general-purpose or special-purpose computer. As an example and not limitation, the computer readable medium may include an RAM, an ROM, an EEPROM, a CD-ROM or other optical disk storage devices, magnetic disk storage devices or other magnetic storage devices, or any other medium that can be used to carry or store necessary program codes in the form of instructions or data structures and can be accessed by a general-purpose or special-purpose computer or a general-purpose or special-purpose processor. Furthermore, any connection is properly termed a computer readable medium. For example, if a coaxial cable, a fiber optic cable, a twisted pair, a digital subscriber line (DSL), or wireless technologies such as infrared, radio and microwave are used to send software from a website, server or other remote sources, the above-mentioned coaxial cable, fiber optic cable, twisted pair, DSL, or wireless technologies such as infrared, radio and microwave are all included in the definition of the medium. As used herein, magnetic disks and optical disks include compact disks (CDs), laser disks, optical disks, digital versatile disks (DVD), floppy disks, and Blu-ray disks. Magnetic disks usually reproduce data magnetically, while optical disks optically reproduce data using laser. Combinations of the above contents should also be included in the scope of the computer readable medium.

It is to be noted that various changes and modifications can be made without departing from the scope of the present disclosure. The functions, steps and/or actions according to the embodiments of the present disclosure described herein do not need to be performed in any specific order. In addition, although the element of the present disclosure may be described or required in an individual form, a plurality may also be envisaged, unless explicitly limited to a singular.

It should be understood that, as used herein, unless the context clearly supports exceptions, the singular form "a" ("a", "an", "the") is intended to also include the plural form. It should also be understood that "and/or" as used herein refers to any and all possible combinations including one or more items listed in association.

The serial numbers of the above embodiments of the present disclosure are for description, and do not represent the superiority or inferiority of the embodiments.

A person having an ordinary skill in the art can understand that all or part of the steps implementing the abovementioned embodiments can be carried out by hardware, or by a program instructing relevant hardware. The program may be stored in a computer readable storage medium. The abovementioned storage medium may be a read-only memory, a magnetic disk or an optical disk, etc.

A person having an ordinary skill in the art should understand that the discussion of any of the above embodiments is exemplary, and is not intended to imply that the scope of the present disclosure is limited to these examples. With the concept of the embodiments of the present disclosure, the technical features of the above embodiments or different embodiments may also be combined, and there are many other changes in different aspects of the embodiments of the present disclosure as described above, which are not provided in detail for the sake of brevity. Therefore, any omission, modification, equivalent substitution, improvement, etc. made within the spirit and principle of the embodiments of the present disclosure should be encompassed in the protection scope of the embodiments of the present disclosure.

The invention claimed is:

1. A method for managing an Internet of Things device, comprising:
    creating a group resource, the group resource comprising a first member and a first preset condition; and
    determining, from a plurality of Internet of Things devices, at least one Internet of Things device whose relationship with the first member satisfies the first preset condition as a second member of the group resource,
    wherein the first preset condition comprises at least one of the following:
    a distance between the second member and the first member being less than a first distance threshold, and
    a difference between a communication signal intensity of the second member and a communication signal intensity of the first member being less than a first intensity difference threshold;
    wherein the group resource further comprises a seventh preset condition, and the method further comprises:
    after determining the second member:

acquiring data collected by the first member and data collected by the second member; and determining whether a relationship between the data collected by the first member and the data collected by the second member meets the seventh preset condition, and under the condition that the relationship between the data collected by the first member and the data collected by the second member meets the seventh preset condition, adjusting a second configuration information of the second member according to a first configuration information of the first member, wherein the seventh preset condition comprises a difference between the data collected by the second member and the data collected by the first member being greater than a data difference threshold.

2. The method according to claim 1, wherein said creating a group resource comprises:

acquiring the first preset condition and a fifth preset condition for the group resource;

determining, from a plurality of Internet of Things devices, at least one Internet of Things device that meets the fifth preset condition as the first member; and including the first member, the first preset condition and the fifth preset condition in the group resource, wherein the fifth preset condition comprises at least one of the following:

positional coordinates of the first member being in a first coordinate range; and a variation range of positional information of the first member within a first preset time interval being smaller than a first preset positional variation range threshold.

3. The method according to claim 1, wherein said creating a group resource comprises:

acquiring the first preset condition for the group resource, and determining the at least one Internet of Things device that sends a request for creating a group resource as the first member of the group resource in response to receiving, from at least one Internet of Things device of the plurality of Internet of Things devices, the request for creating a group resource; and including the first preset condition and the first member in the group resource.

4. The method according to claim 1, wherein the group resource further comprises a second preset condition, and the method further comprises:

after determining the second member, determining whether a relationship between the first member and the second member meets the second preset condition, and under the condition that the relationship between the first member and the second member meets the second preset condition, adjusting a second configuration information of the second member according to a first configuration information of the first member, wherein the second preset condition comprises at least one of the following:

a device type of the first member being the same as a device type of the second member; and a type of data collected by the first member being the same as a type of data collected by the second member.

5. The method according to claim 1, wherein the group resource further comprises a fourth preset condition, and the method further comprises:

after determining the second member, determining whether a relationship between the first member and the second member meets the fourth preset condition, and under the condition that the relationship between the first member and the second member meets the fourth preset condition, adjusting a second configuration information of the second member according to a first configuration information of the first member, wherein the fourth preset condition comprises at least one of the following conditions:

a data collection accuracy of the first member being greater than a data collection accuracy of the second member;

a data collection frequency of the first member being greater than a data collection frequency of the second member;

a number of references to data of the first member being larger than a number of references to data of the second member; and a communication signal intensity of the first member being greater than a communication signal intensity of the second member.

6. The method according to claim 1, wherein the group resource comprises a third preset condition, and the method further comprises:

after determining the second member, determining whether the second member meets the third preset condition, and under the condition that the second member meets the third preset condition, deleting the second member from the group resource, wherein the third preset condition comprises at least one of the following:

a distance between the second member and the first member being greater than a second distance threshold; and a difference between a communication signal intensity of the second member and a communication signal intensity of the first member being greater than a second intensity difference threshold.

7. The method according to claim 1, wherein, said determining, from a plurality of Internet of Things devices, at least one Internet of Things device whose relationship with the first member meets the first preset condition comprises:

in response to receiving a group joining request from at least one Internet of Things device of the plurality of Internet of Things devices, determining whether a relationship between the first member and the at least one Internet of Things device of the plurality of Internet of Things devices that sends the group joining request meets the first preset condition.

8. The method according to claim 7, wherein the group resource further comprises a sixth preset condition, and wherein said determining, from a plurality of Internet of Things devices, at least one Internet of Things device whose relationship with the first member meets the first preset condition comprises:

in response to said receiving a group joining request from at least one Internet of Things device of the plurality of Internet of Things devices, determining whether the at least one Internet of Things device that sends the group joining request meets the sixth preset condition, and under the condition that the at least one Internet of Things device that sends the group joining request meets the sixth preset condition, determining, from the at least one Internet of Things device that meets the sixth preset condition, an Internet of Things device whose relationship with the first member meets the first preset condition, wherein the sixth preset condition comprises at least one of the following:

positional coordinates of the second member being in a second coordinate range; and a variation range of positional information of the second member within a first preset time interval being larger than a second preset positional variation range threshold.

9. The method according to claim 1, wherein the Internet of Things device is an environmental monitoring device, and data collected by the first member and the second member are all environmental monitoring data.

10. The method according to claim 1, wherein the first member has a control authority over the second member, and the second member does not have a control authority over the first member.

11. The method according to claim 2, wherein the fifth preset condition further comprises at least one of the following:

data collection accuracy of the first member being greater than a first data collection accuracy threshold;

a data collection frequency of the first member being greater than a first data collection frequency threshold;

a number of references to data of the first member being larger than a first threshold of a number of references to data; and a communication signal intensity of the first member being greater than a first preset communication signal intensity.

12. The method according to claim 8, wherein the sixth preset condition further comprises at least one of the following:

a data collection accuracy of the second member being less than a second data collection accuracy threshold;

a data collection frequency of the second member being less than a second data collection frequency threshold;

a number of references to data of the second member being smaller than a second threshold of a number of references to data; and a communication signal intensity of the second member being less than a second preset communication signal intensity.

13. An apparatus for managing an Internet of Things device, comprising:

a processor; and a memory, the memory being communicatively connected to the processor, wherein at least one instruction is stored on the memory, and the at least one instruction is configured to carry out the method according to claim 1 when executed by the processor.

14. A non-transitory computer readable storage medium storing a computer program, wherein the computer program carries out operations of the method according to claim 1 when executed by a processor.

15. The non-transitory computer readable storage medium according to claim 14, wherein said creating a group resource comprises:

acquiring the first preset condition and a fifth preset condition for the group resource;

determining, from a plurality of Internet of Things devices, at least one Internet of Things device that meets the fifth preset condition as the first member; and including the first member, the first preset condition and the fifth preset condition in the group resource, wherein the fifth preset condition comprises at least one of the following:

positional coordinates of the first member being in a first coordinate range; and a variation range of positional information of the first member within a first preset time interval being smaller than a first preset positional variation range threshold.

16. The non-transitory computer readable storage medium according to claim 14, wherein said creating a group resource comprises:

acquiring the first preset condition for the group resource, and determining the at least one Internet of Things device that sends a request for creating a group resource as the first member of the group resource in response to receiving, from at least one Internet of Things device of the plurality of Internet of Things devices, a request for creating a group resource; and including the first preset condition and the first member in the group resource.

17. The non-transitory computer readable storage medium according to claim 14, wherein the group resource further comprises a second preset condition, and the method further comprises:

after determining the second member, determining whether a relationship between the first member and the second member meets the second preset condition, and under the condition that the relationship between the first member and the second member meets the second preset condition, adjusting a second configuration information of the second member according to a first configuration information of the first member, wherein the second preset condition comprises at least one of the following:

a device type of the first member being the same as a device type of the second member; and a type of data collected by the first member being the same as a type of data collected by the second member.

18. The non-transitory computer readable storage medium according to claim 14, wherein the group resource further comprises a fourth preset condition, and the method further comprises:

after determining the second member, determining whether a relationship between the first member and the second member meets the fourth preset condition, and under the condition that the relationship between the first member and the second member meets the fourth preset condition, adjusting a second configuration information of the second member according to a first configuration information of the first member;

wherein the fourth preset condition comprises at least one of the following conditions:

a data collection accuracy of the first member being greater than a data collection accuracy of the second member;

a data collection frequency of the first member being greater than a data collection frequency of the second member;

a number of references to data of the first member being larger than a number of references to data of the second member; and a communication signal intensity of the first member being greater than a communication signal intensity of the second member.

19. The non-transitory computer readable storage medium according to claim 14, wherein the group resource comprises a third preset condition, and the method further comprises:

after determining the second member, determining whether the second member meets the third preset condition, and under the condition that the second member meets the third preset condition, deleting the second member from the group resource,
wherein the third preset condition comprises at least one of the following:
a distance between the second member and the first member being greater than a second distance threshold; and
a difference between a communication signal intensity of the second member and a communication signal intensity of the first member being greater than a second intensity difference threshold.

* * * * *